(12) United States Patent
He et al.

(10) Patent No.: US 7,883,214 B2
(45) Date of Patent: Feb. 8, 2011

(54) COMPACT IMAGE PROJECTION ARRANGEMENT WITH CORRECTION FOR LASER BEAM ANGULAR MISALIGNMENT

(75) Inventors: Duanfeng He, South Setauket, NY (US); Miklos Stern, Woodmere, NY (US); Dmitriy Yavid, Stony Brook, NY (US)

(73) Assignee: Microvision, Inc., Redmond, WA (US)

( * ) Notice: Subject to any disclaimer, the term of this patent is extended or adjusted under 35 U.S.C. 154(b) by 963 days.

(21) Appl. No.: 11/711,980

(22) Filed: Feb. 28, 2007

(65) Prior Publication Data
US 2008/0204669 A1    Aug. 28, 2008

(51) Int. Cl.
*G03B 21/38* (2006.01)
*G03B 21/14* (2006.01)

(52) U.S. Cl. .............................. 353/69; 353/30; 353/81
(58) Field of Classification Search .................... 353/30, 353/31, 32, 33, 37, 81, 121, 69
See application file for complete search history.

(56) References Cited

U.S. PATENT DOCUMENTS

| | | | | |
|---|---|---|---|---|
| 5,617,243 A * | 4/1997 | Yamazaki et al. | ........... | 359/309 |
| 6,483,556 B1 * | 11/2002 | Karakawa et al. | ........... | 348/750 |
| 6,945,652 B2 * | 9/2005 | Sakata et al. | .................. | 353/30 |
| 7,006,269 B2 * | 2/2006 | Hama et al. | .............. | 359/204.1 |
| 7,352,499 B2 * | 4/2008 | Yavid et al. | .............. | 359/198.1 |
| 7,367,682 B2 * | 5/2008 | Dvorkis et al. | .............. | 353/101 |
| 7,433,108 B2 * | 10/2008 | Tan et al. | .................. | 359/204.1 |
| 7,468,508 B2 * | 12/2008 | DeLazari et al. | ............ | 250/235 |
| 7,665,852 B2 * | 2/2010 | Yavid et al. | .................... | 353/85 |
| 7,665,853 B2 * | 2/2010 | Yavid | ........................... | 353/98 |
| 2003/0011751 A1 * | 1/2003 | Sakata et al. | .................. | 353/30 |
| 2004/0141220 A1 * | 7/2004 | Hama et al. | ................. | 359/204 |
| 2006/0119804 A1 * | 6/2006 | Dvorkis et al. | ................ | 353/98 |
| 2006/0279664 A1 * | 12/2006 | Tan et al. | .................... | 348/789 |
| 2007/0273843 A1 * | 11/2007 | Stern et al. | .................... | 353/98 |
| 2007/0278393 A1 * | 12/2007 | Delazari et al. | ............ | 250/235 |
| 2007/0279509 A1 * | 12/2007 | Tan et al. | ................. | 348/333.1 |
| 2007/0279536 A1 * | 12/2007 | Tan et al. | .................... | 348/750 |
| 2007/0279722 A1 * | 12/2007 | Yavid et al. | .................... | 359/212 |
| 2007/0285625 A1 * | 12/2007 | Yavid et al. | .................... | 353/85 |
| 2007/0285629 A1 * | 12/2007 | Yavid | ........................... | 353/97 |
| 2008/0204669 A1 * | 8/2008 | He et al. | ....................... | 353/69 |

* cited by examiner

*Primary Examiner*—John R Lee
(74) *Attorney, Agent, or Firm*—Kevin D. Wills

(57) ABSTRACT

A lightweight, compact image projection module has a laser package having a common exit port, and a plurality of lasers mounted in the package and operative for emitting a plurality of laser beams of different wavelengths through the common exit port. An optical assembly focuses the laser beams exiting the common exit port, and includes a common focusing lens through which the laser beams pass along respective paths that are in angular misalignment. An optical corrector element in at least one of the paths corrects the misalignment to produce aligned beams. A scanner sweeps the aligned beams in a pattern of scan lines, each scan line having a number of pixels. A controller causes selected pixels to be illuminated, and rendered visible, by the aligned beams to produce the image.

15 Claims, 7 Drawing Sheets

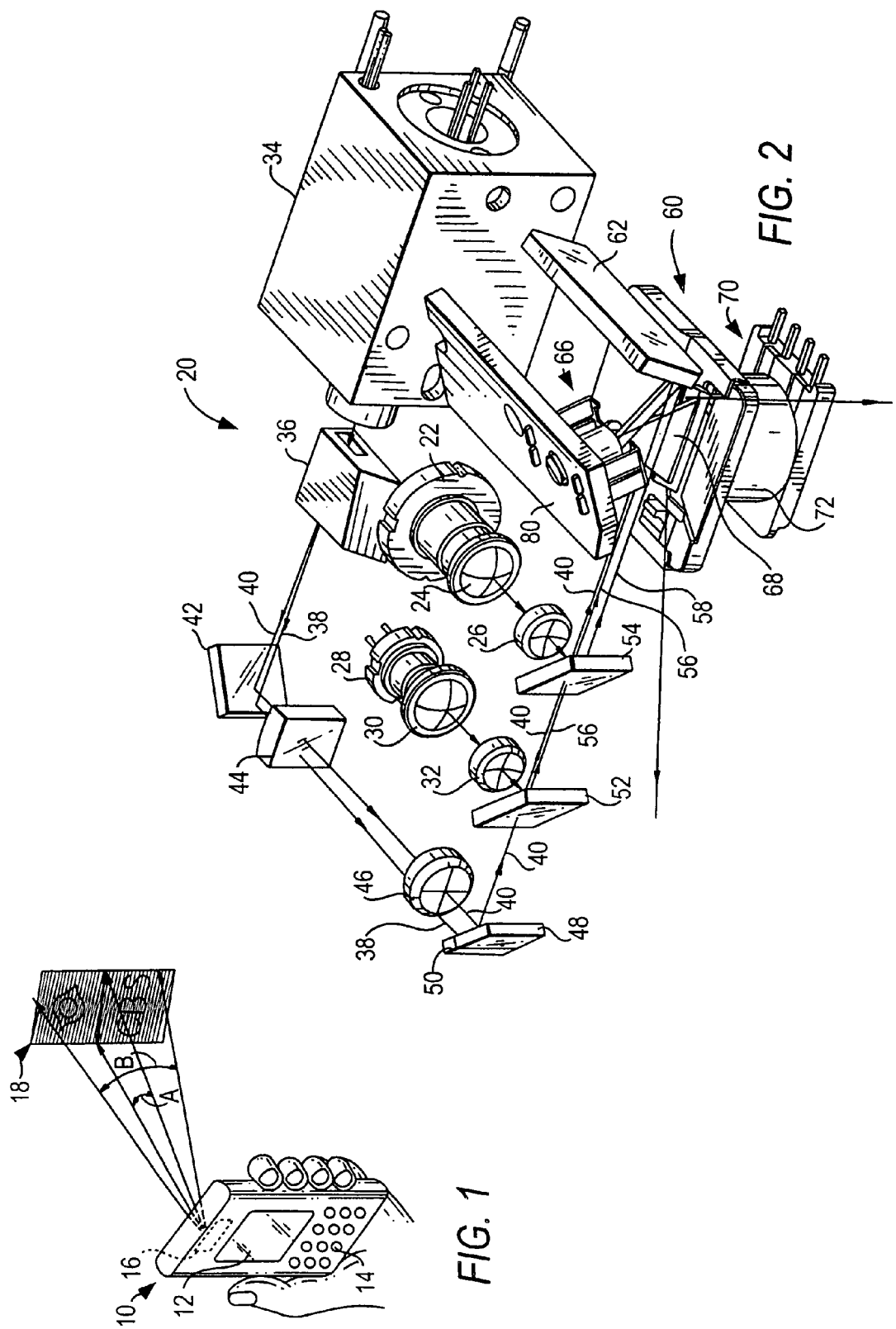

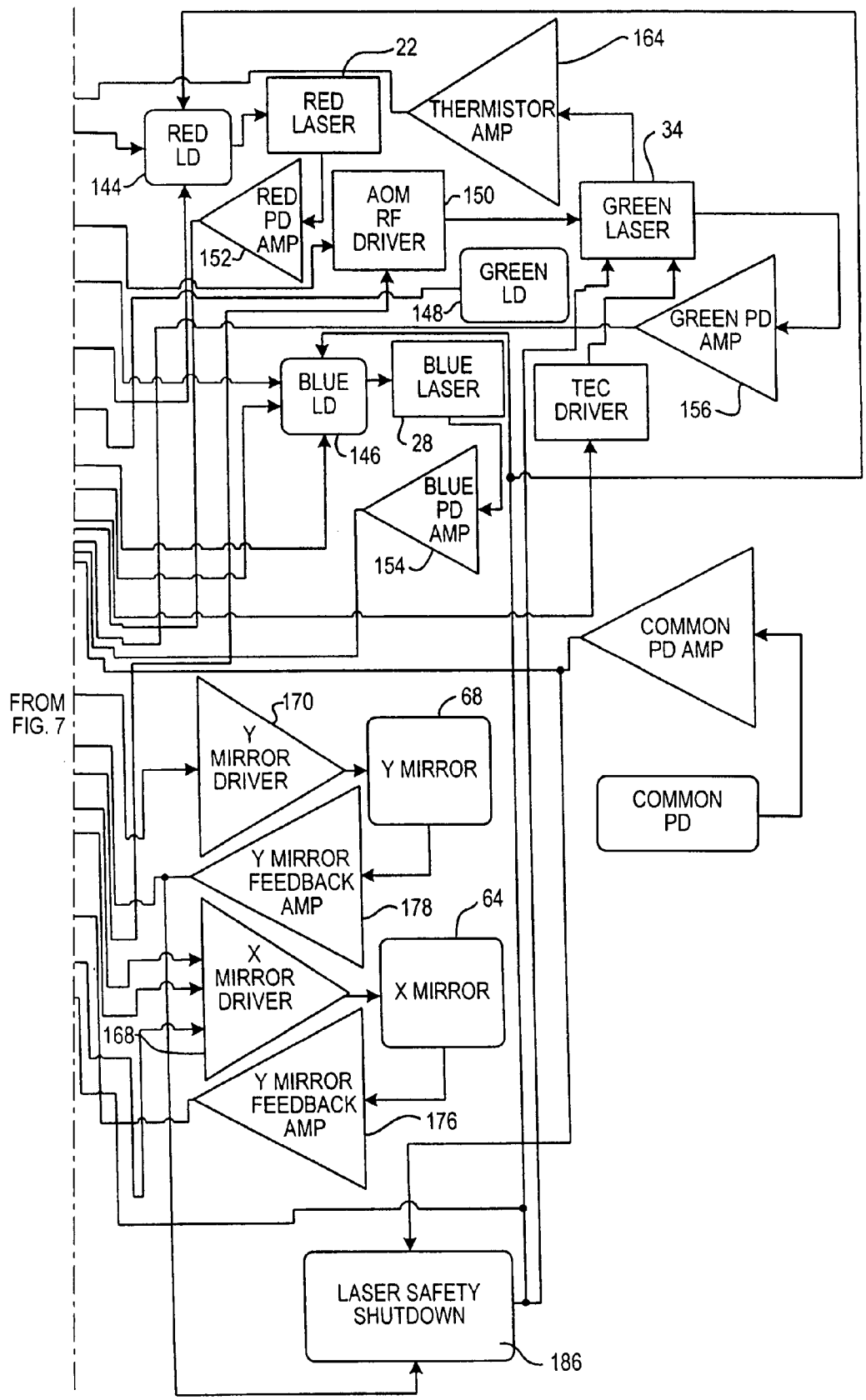

COMPACT IMAGE PROJECTION ARRANGEMENT WITH CORRECTION FOR LASER BEAM ANGULAR MISALIGNMENT

BACKGROUND OF THE INVENTION

1. Field of the Invention

The present invention generally relates to a color image projection arrangement and, more particularly, to reducing the size, weight and assembly cost of the arrangement.

2. Description of the Related Art

It is generally known to project a two-dimensional image in color on a screen based on a pair of scan mirrors which oscillate in mutually orthogonal directions to scan a plurality of differently colored and focused laser beams, for example, red, blue and green, over a raster pattern of scan lines, each scan line having a number of pixels. A controller processes video data from a host, as well as control data with the host in order to form the image by selectively energizing and deenergizing a plurality of lasers that emit the laser beams.

The known image projection arrangements require each laser to be mounted in its own package having an exit port. Also, each laser beam exiting a respective port is required to be focused and shaped by its own set of optical elements. In addition, all the laser beams must be combined before being directed to the scan mirrors.

As advantageous as these known arrangements are, the use of multiple laser packages and multiple focusing, shaping and combining optical elements occupy space and add weight and cost, not only in the manufacture and supply of multiple parts, but also in the installation and alignment of multiple parts. Reducing the size, weight and assembly cost of the arrangement enables its ready integration into many more devices.

SUMMARY OF THE INVENTION

One feature of this invention resides, briefly stated, in an image projection arrangement for, and a method of, projecting a two-dimensional, color image. The arrangement includes a support; a laser assembly on the support, for emitting a plurality of laser beams of different wavelengths; an optical assembly on the support, for focusing the laser beams; a scanner on the support, for sweeping the focused beams in a pattern of scan lines in space at a working distance from the support, each scan line having a number of pixels; and a controller operatively connected to the laser assembly and the scanner, for causing selected pixels to be illuminated, and rendered visible, by the focused beams to produce the image.

In the preferred embodiment, the laser assembly includes a plurality of red, blue and green lasers for respectively emitting red, blue and green laser beams; and the scanner includes a pair of oscillatable scan mirrors for sweeping the focused beams along generally mutually orthogonal directions at different scan rates and at different scan angles.

In accordance with one aspect of this invention, a plurality of the lasers is mounted in a single, common laser package having a common exit port through which a plurality of the laser beams pass. Preferably, these lasers constitute red and blue, solid-state, semiconductor laser chips mounted on a common substrate within the package for respectively generating red and blue laser beams. By packaging a plurality of lasers in a single package, overall system weight, size, assembly cost, and complexity are reduced.

After the laser beams exit the common exit port, according to another aspect of this invention, the laser beams are directed to a common focusing lens through which the laser beams pass along respective paths that are in angular misalignment. A common aperture stop may be located in the paths of the laser beams exiting the common exit port. Again, by sharing a focusing lens and an aperture stop for a plurality of beams, overall system weight, size, assembly cost, and complexity are reduced.

An optical corrector element is provided in at least one of the paths for correcting the misalignment to produce aligned beams that are directed to the scanner. The optical corrector element may be a prism, a lens, a grating, or a folding mirror. The optical corrector element is operative for directing one laser beam in at least one of the paths, or both laser beams in a pair of the paths, to a common footprint on the scan mirror.

The image resolution preferably exceeds one-fourth of VGA quality, but typically equals or exceeds VGA quality. The support, laser assembly, scanner, controller, and optical assembly preferably occupy a volume of less than thirty cubic centimeters.

The assembly is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

DETAILED DESCRIPTION OF THE PREFERRED EMBODIMENTS

Figure 3:
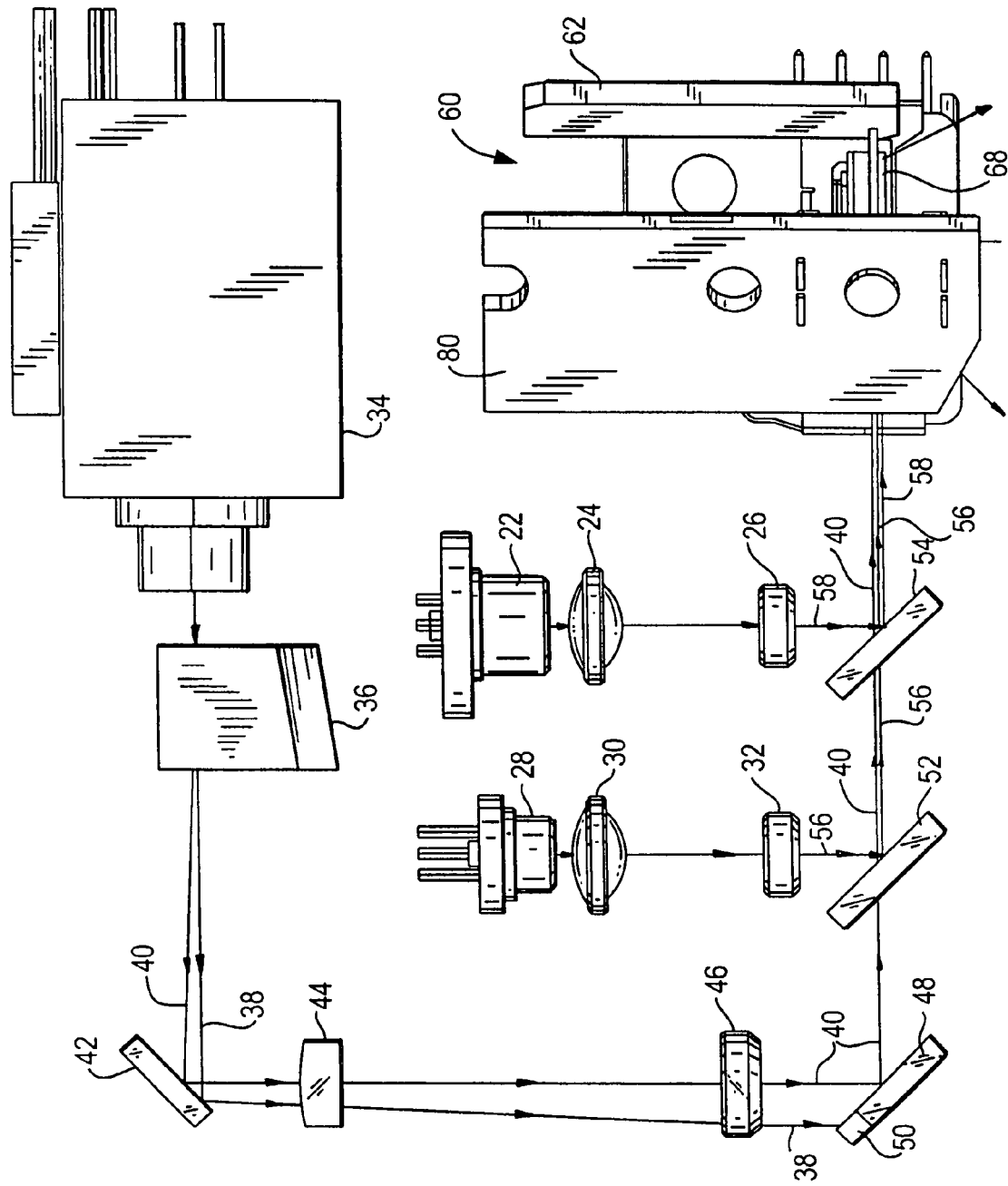
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell, or a wristwatch.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a packaged semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another solid-state, packaged semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam at 1060 nanometers. A non-linear frequency doubling crystal is included in the infrared laser cavity between the two laser mirrors. Since the infrared laser power inside the cavity is much larger than the power coupled outside the cavity, the frequency doubler is more efficient for generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator 36 which creates an acoustic standing wave inside a crystal for diffracting the green beam. The modulator 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, an electro-optic, modulator can be used either externally or internally to the green laser module to pulse the green laser beam. Other possible ways to modulate the green laser beam include electro-absorption modulation, or Mach-Zender interferometer. The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as collinear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
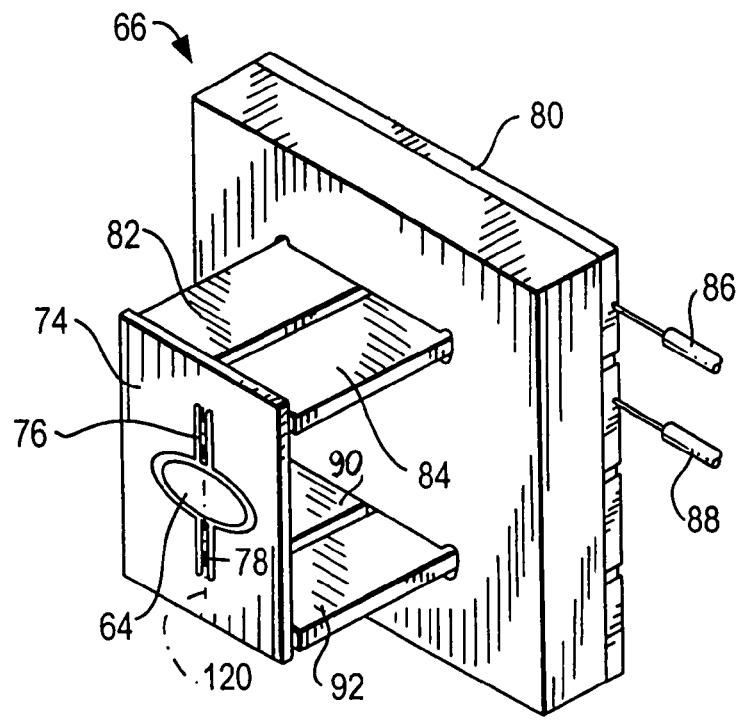
FIG. 4 is a perspective front view of an inertial drive for use in the arrangement of FIG. 2.
Figure 5:
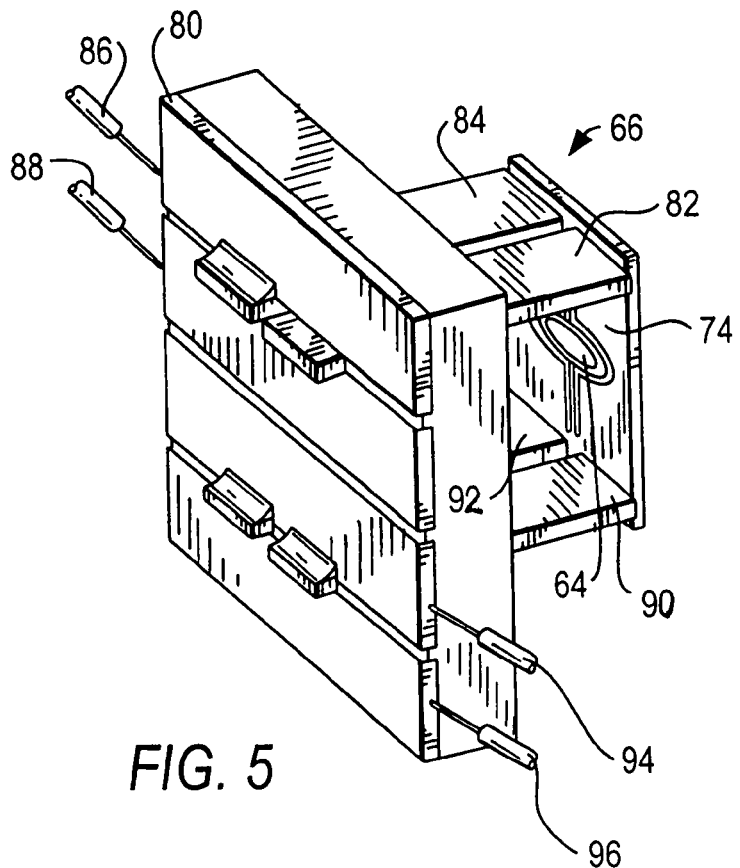
FIG. 5 is a perspective rear view of the inertial drive of FIG. 4.

The nearly collinear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150 microns thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749 microns×1600 microns. Each hinge portion measures 27 microns in width and 1130 microns in length. The frame has a rectangular shape measuring 3100 microns in width and 4600 microns in length.

The inertial drive is mounted on a generally planar, printed circuit board 80 and is operative for directly moving the frame and, by inertia, for indirectly oscillating the scan mirror 64 about the hinge axis.

One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150 microns thick, and the scan mirror has a high Q factor. A movement on the order of 1 micron by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range a high-definition television standard, denoted 720p, 1270×720 pixels can be displayed. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
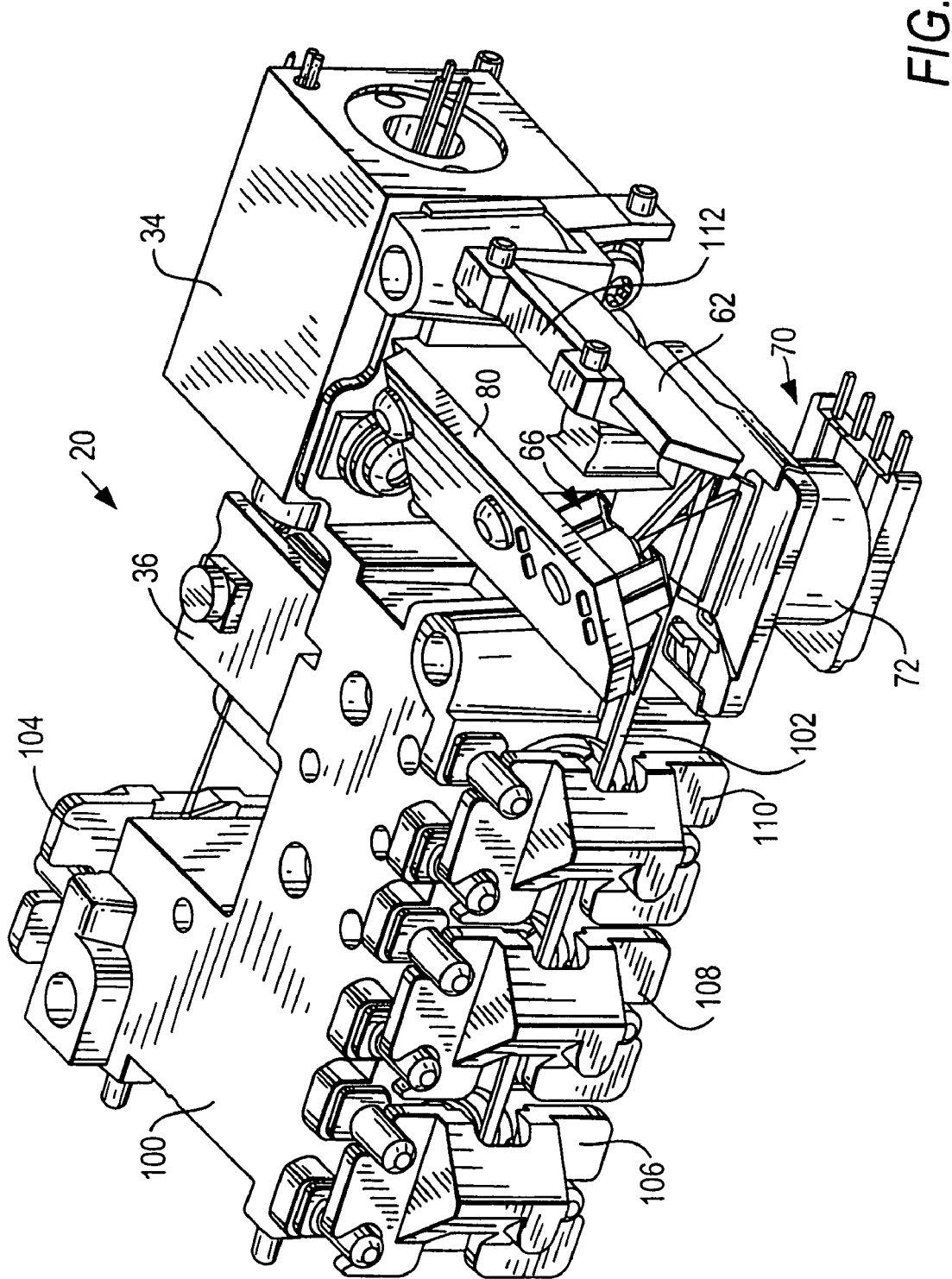
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or controller by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
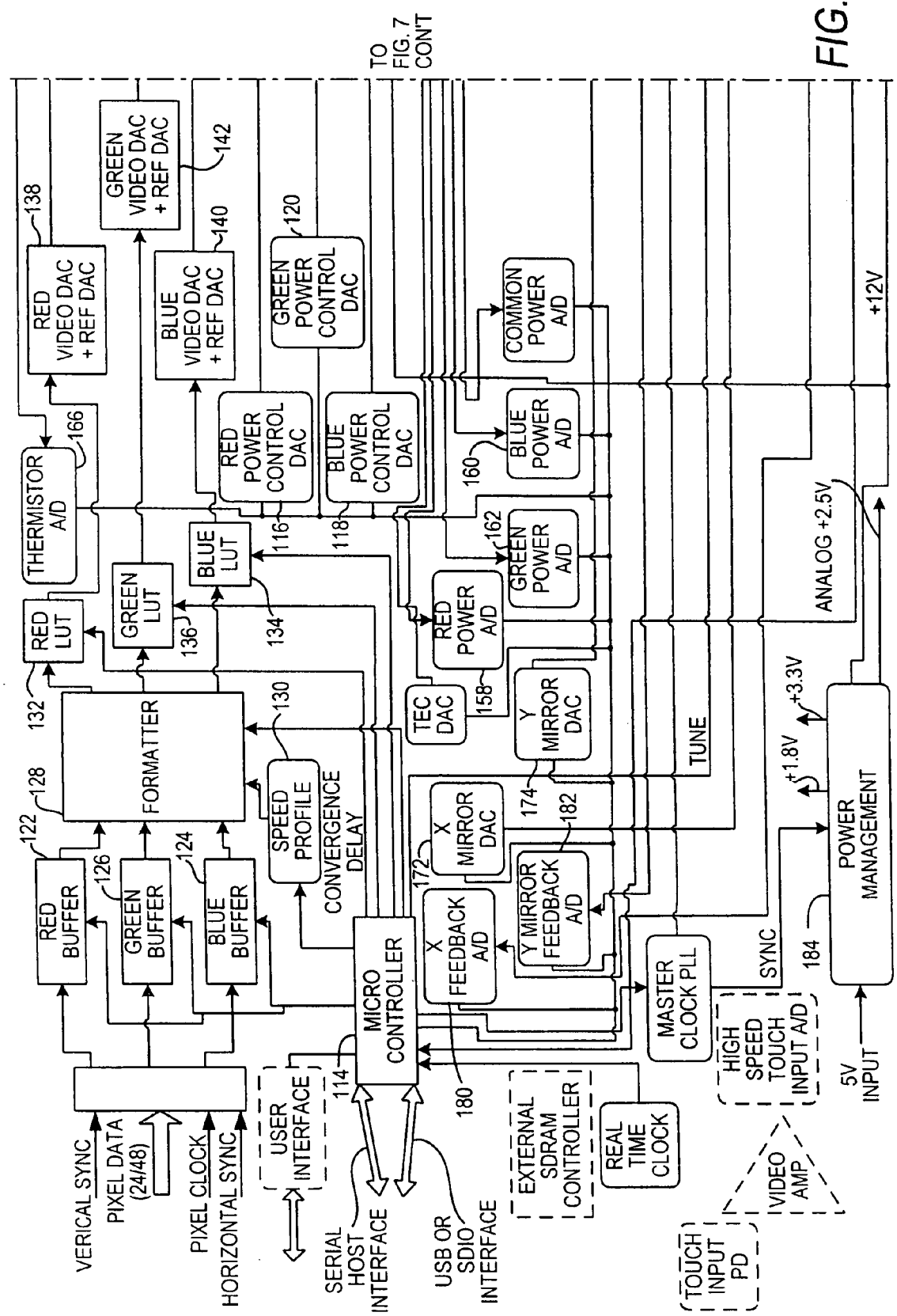
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
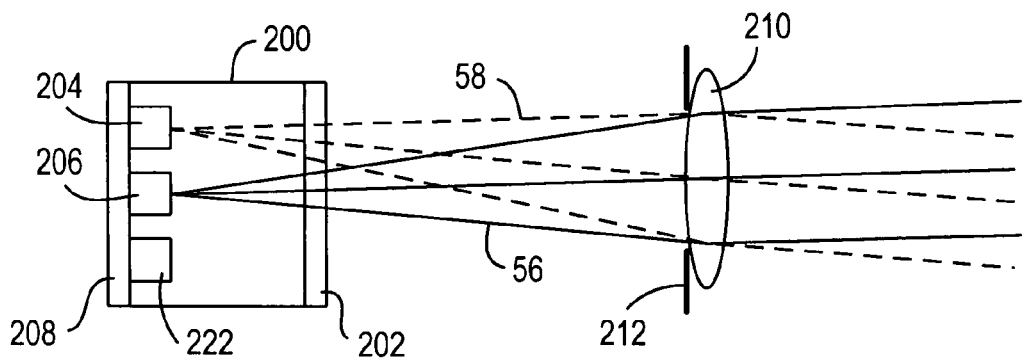
FIG. 8 is a block diagram depicting an assembly of a plurality of lasers in a single package sharing an aperture stop and a focusing lens.

In accordance with one aspect of this invention, as shown in FIG. 8, the above-described image projection arrangement is improved by mounting a plurality of the lasers in a single, common laser package 200 having a common exit port 202 through which a plurality of the laser beams pass. Preferably, these lasers constitute red and blue, solid-state, semiconductor laser chips 204, 206 mounted on a common substrate 208 within the package 200 for respectively generating the red and blue laser beams 58, 56. The red chip 204 was previously mounted in the packaged laser 22, while the blue chip 206 was previously mounted in the blue laser 28. By packaging a plurality of laser chips in a single package, rather than in a plurality of packages, overall system weight, size, assembly cost, and complexity are reduced.

After the laser beams 58, 56 exit the common exit port 202, according to another aspect of this invention, the laser beams 58, 56 are directed to a common focusing lens 210 through which the laser beams 58, 56 pass along respective paths. Because the laser chips 204, 206 are physically located in close proximity in the package 200, they are at equal distances from the lens 210, and a single lens 210 can indeed collimate both laser beams 58, 56 simultaneously. A common aperture stop 212 may be located in the paths of the laser beams 58, 56 exiting the common exit port 202. Again, by sharing a focusing lens and an aperture stop for a plurality of beams, overall system weight, size, assembly cost, and complexity are reduced since a separate optical train for focusing and shaping each laser beam is not needed.

A downside of the above-described assembly is that the outgoing beams passing through the lens 210 are slightly misaligned and, as shown in FIG. 8, diverge in a direction away from the lens 210. The amount of the misalignment depends on the distance of separation of the chips 204, 206, as well as on the distance of the lens 210 from the package 200. By placing the chips closer to each other, the misalignment can be reduced. The misaligned beams are directed to the scan mirror 64 where they illuminate spaced-apart spots or footprints on the scan mirror. These footprints must overlap so that the scan mirror can be made as small as possible, which helps to reduce the drive power it requires.

Figure 9:
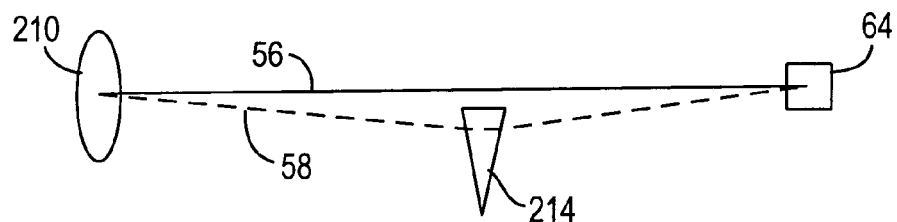
FIGS. 9-12 are diagrams of different optical corrector elements for correcting for angular misalignment in the assembly of FIG. 8.
Figure 10:
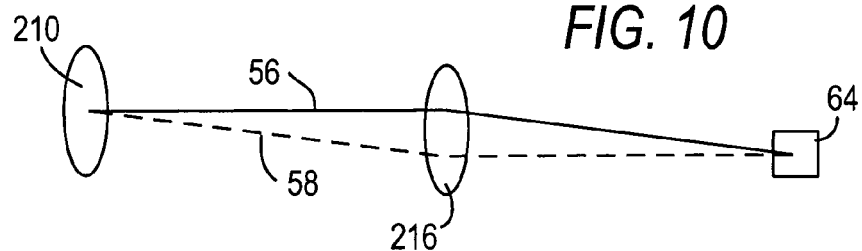
Figures 11, 12:
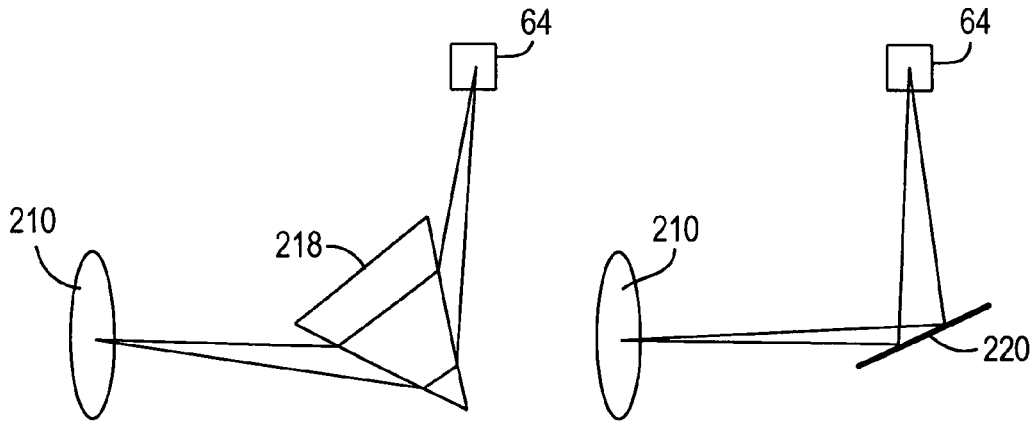

To further reduce the misalignment, an optical corrector element is provided in at least one of the paths for correcting the misalignment to produce aligned beams that are directed to the scan mirror 64. As shown in FIG. 9, a prism 214 is mounted in the path of one of the beams. As shown in FIG. 10, a lens 216 is mounted in the paths of both beams 58, 56. As shown in FIG. 11, a prism 218 is mounted in the paths of both of the beams. As shown in FIG. 12, a grating 220 is mounted in the paths of both of the beams. The optical corrector element may also be one or more folding mirrors. The optical corrector element is operative for directing one laser beam in at least one of the paths, or both laser beams in a pair of the paths, to a common footprint on the scan mirror 64.

Exiting the scan mirror, the alignment again manifests as an angular one, which can be compensated for electronically by adjusting the relative timing of the modulation signals for the different lasers in the package 200. In the case of FIG. 10, because lens 216 introduces additional power, lens 210 may be chosen such that it under-collimates the beams slightly, to be compensated for by lens 216.

It is advantageous to place the corrector element relatively close to the lens 210 so that the spatial separation between the beams is small. It is also advantageous to use high precision equipment to fix the spacing between the laser chips in both amplitude and direction. For example, the chips can be spaced apart only along the scan direction of each scan line.

It is customary for one or more monitor photodetectors 222 to be packaged with a laser chip to monitor its output power. For the package 200, one or more monitor photodiodes can be assigned to each chip and be mounted on the substrate 208. In this case, an optical bandpass filter is fitted to each monitor photodiode so that it only receives light from the chip it is assigned to monitor.

In another case, only one of the photodiodes is used to monitor all the chips in the package. The chips are monitored only periodically and in mutually exclusive time periods during which only one chip is energized for each period. Typically, the first scan line is dedicated to power monitoring, and not used for image formation. This first scan line is usually blocked from the image. This design further reduces complexity because the monitoring photodiode 222 is combined for a plurality of chips.

It will be understood that each of the elements described above, or two or more together, also may find a useful application in other types of constructions differing from the types described above.

While the invention has been illustrated and described as embodied in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection arrangement for projecting a two-dimensional, color image, comprising:
   a scanner including a movable scan mirror;
   a laser package spaced away from the scan mirror, and including a common substrate, a common exit port, and a plurality of solid-state, semiconductor laser chips mounted on the common substrate within the package, the laser chips being operative for emitting a plurality of laser beams of different wavelengths through the common exit port towards the scan mirror;

a common focusing lens through which the plurality of laser beams pass towards the scan minor along respective divergent paths that are in angular misalignment;

an optical corrector element positioned in at least one of the divergent paths, for correcting the misalignment, and for directing the plurality of laser beams to be incident, and occupy a common footprint, on the scan minor; and a controller for moving the scan minor to sweep the incident laser beams in a pattern of scan lines in space, each scan line having a number of pixels, and for causing selected pixels to be illuminated, and rendered visible, to produce the image.

2. The image projection arrangement of claim 1, wherein the laser chips are spaced apart on the common substrate and respectively generate red and blue laser beams.

3. The image projection arrangement of claim 1, and further comprising a diode-pumped YAG laser located exteriorly of the package and an optical frequency doubler for producing a green laser beam.

4. The image projection arrangement of claim 1, wherein the scan minor is oscillatable for sweeping the incident beams along a first direction at a first scan rate and over a first scan angle, and wherein the scanner includes another oscillatable scan minor for sweeping the swept beams along a second direction substantially perpendicular to the first direction, and at a second scan rate different from the first scan rate, and at a second scan angle different from the first scan angle.

5. The image projection arrangement of claim 1, and further comprising a common aperture stop through which the plurality of laser beams pass towards the scan minor.

6. The image projection arrangement of claim 1, wherein the optical corrector element is a prism.

7. The image projection arrangement of claim 1, wherein the optical corrector element is a lens.

8. The image projection arrangement of claim 1, wherein the optical corrector element is a grating.

9. The image projection arrangement of claim 1, wherein the optical corrector element is positioned in only one of the divergent paths.

10. The image projection arrangement of claim 1, wherein the optical corrector element is positioned in a plurality of the divergent paths.

11. The image projection arrangement of claim 1, wherein the controller is operative for energizing the laser chips to illuminate the selected pixels, and for deenergizing the laser chips to non-illuminate pixels other than the selected pixels.

12. An image projection arrangement for projecting a two-dimensional, color image, comprising:

scanning means including a movable scan mirror;

a laser package spaced away from the scan mirror, and including a common substrate, a common exit port, and a plurality of solid-state, semiconductor laser chips mounted on the common substrate within the package, the laser chips being operative for emitting a plurality of laser beams of different wavelengths through the common exit port towards the scan mirror;

common focusing means through which the plurality of laser beams pass towards the scan minor along respective divergent paths that are in angular misalignment;

optical corrector means positioned in at least one of the divergent paths, for correcting the misalignment, and for directing the plurality of laser beams to be incident, and occupy a common footprint, on the scan minor; and control means for moving the scan minor to sweep the incident laser beams in a pattern of scan lines in space, each scan line having a number of pixels, and for causing selected pixels to be illuminated, and rendered visible, to produce the image.

13. The image projection arrangement of claim 12, wherein the optical corrector means is positioned in only one of the divergent paths.

14. The image projection arrangement of claim 12, wherein the optical corrector means is positioned in a plurality of the divergent paths.

15. The image projection arrangement of claim 12, wherein the control means is operative for energizing the laser chips to illuminate the selected pixels, and for deenergizing the laser chips to non-illuminate pixels other than the selected pixels.

* * * * *